United States Patent [19]

Lund

[11] Patent Number: 4,507,026
[45] Date of Patent: Mar. 26, 1985

[54] DEPTH CONTROL ASSEMBLY

[75] Inventor: Wesley C. Lund, Seattle, Wash.

[73] Assignee: Boeing Aerospace Company, Seattle, Wash.

[21] Appl. No.: 428,021

[22] Filed: Sep. 29, 1982

[51] Int. Cl.³ ............................................. B23B 45/14
[52] U.S. Cl. .................................... 408/72 B; 408/14; 408/97; 408/202; 408/241 G
[58] Field of Search ................... 408/14, 72 B, 241 B, 408/97, 110, 112, 202, 115

[56]  References Cited

U.S. PATENT DOCUMENTS

| | | | |
|---|---|---|---|
| 2,192,528 | 3/1940 | Schmidt | 408/112 |
| 2,608,114 | 8/1952 | Martin et al. | 408/202 X |
| 2,636,404 | 4/1953 | Davis | 408/97 |
| 2,794,353 | 6/1957 | Bashlow et al. | 408/113 |
| 2,831,376 | 4/1958 | Daniels | 408/112 |
| 2,868,044 | 1/1959 | Chaffee et al. | 408/110 |
| 2,883,891 | 4/1959 | Shulters et al. | 408/112 |
| 2,891,428 | 6/1959 | Donee | 408/112 |
| 2,935,905 | 5/1960 | Winslow | 408/112 |
| 3,024,673 | 3/1962 | Winslow et al. | 408/112 |
| 3,083,593 | 4/1963 | Cotter | 408/241 |
| 3,397,600 | 8/1968 | Wells | 408/112 |
| 3,460,408 | 8/1969 | Raymond | 408/112 |
| 3,487,729 | 1/1970 | Juhasz et al. | 408/14 |
| 3,689,171 | 9/1972 | Bouzounie | 408/112 |
| 3,756,736 | 9/1973 | Marcoux | 408/14 |
| 3,767,313 | 10/1973 | Bokoroquez et al. | 408/14 |
| 4,027,992 | 6/1977 | Mackey, Sr. et al. | 408/97 |

Primary Examiner—Z. R. Bilinsky
Attorney, Agent, or Firm—Finnegan, Henderson, Farabow, Garrett & Dunner

[57] ABSTRACT

The depth control assembly for attachment at one end to a machine tool and at the other end to a drill plate of a jig having selected guide holes positioned over points to be drilled in a production part. The depth control assembly is a spring-loaded adaptor which spaces the drill a constant distance from the production part, regardless of differences in distance between the face of the drill plate and the production part. Through the use of the depth control assembly, an operator can drill holes of a constant depth in the production part without taking separate measurements and making new depth adjustments at each hole location.

10 Claims, 7 Drawing Figures

DEPTH CONTROL ASSEMBLY

GOVERNMENTAL RIGHTS

The government has rights in this invention pursuant to Contract No. N00019-80-C-3000 awarded by the Department of the Navy.

BACKGROUND OF THE INVENTION

1. Field of the Invention

The present invention relates generally to a depth control assembly and more specifically to a drill depth control assembly for attachment to the drill plate of a jig having a plurality of guide holes. The drill depth control assembly allows its user to make one depth setting on the drill and drill to the same depth in a production part, regardless of the varying distance between the drill plate and the production part.

DESCRIPTION OF THE PRIOR ART

During precision drilling or similar machining operations on metal or other parts, it is often the practice to use a jig or pattern which fits over the production part to be drilled or machined. Such a jig includes pre-drilled guide holes which are positioned over the points to be drilled in a production part. Often the jig includes a bushing at each pre-drilled guide hole to guide the drill bit. Typically, two slotted lock screws are placed opposite each other at each of the pre-drilled holes in the drill plate of the jig. These lock screws are positioned so that their slots will received a helical type locking device fitted at the forward end of a portable machine tool, such as a drill.

Often, it is desired to drill all of the holes in the production part to a single depth. In the past, an operator drilling holes in the production part would nevertheless have to follow a time consuming process to ensure that each hole was drilled to the correct depth. For each hole, the operator first would measure the distance from the production part to the outer face of the drill plate of the jig. He then would fix the portable drill to the drill plate by engaging the helical locking device of the drill with the lock screws on the drill plate. Next the operator would set the drilling depth of the drill for each hole and cycle the drill to drill and retract.

The distance between the drill plate of the jig and the surface of the production part normally varies because of differences in thickness of the jig, curvature in the drill plate and/or the production part, and expansion and contraction of the jig. Therefore, to ensure accurate depth control, it has in the past been necessary to measure the distance and reset the drill at each hole location.

The above-described process presented significant problems. First, the process was exceedingly time consuming and expensive since it required a measurement at each hole and the resetting of the drill at each hole. Further, because the procedure required measurement at each hole, there was an increased chance for error. Thus, the procedure was both costly and imprecise.

SUMMARY OF THE INVENTION

The object of the present invention is to provide a depth control assembly which allows the machining depth to be set only once and allows its user to machine or drill holes of equal depth in the production part, regardless of differences in distance between the drilling plate of the jig and the production part.

It is a further object to provide a depth control assembly which can be readily adapted to the slotted lock screws and locking helical type devices conventionally used with portable drills and jigs.

Another object is to provide a simple and easily manufactured drill depth control assembly which is easy to use, cost effective, and precise.

Additional objects and advantages of the invention will be set forth in part in the description which follows, and in part will be obvious from the description, or may be learned by practice of the invention. The objects and advantages may be realized and attained by means of the elements and combinations particularly pointed out in the appended claims.

To achieve the objects and in accordance with the purpose of the invention, as embodied and broadly described herein, the present invention includes a drill depth control assembly for attachment at one end to a drill and at the other end to a drill plate of a jig having selected guide holes positioned over the points to be drilled in a production part, the drill depth control assembly comprising a drill bushing member including at its one end a drill bushing sleeve for insertion into a guide hole of the drill plate and for engagement with the production part and further including at its opposite end a drill bushing plate for engagement with the drill, a locking member slidably fitted over the drill bushing sleeve, means for temporarily fixing the locking member to the drill plate, and resilient means for pressing the drill bushing sleeve into engagement with the production part when the locking member is fixed to the drill plate.

In the preferred embodiment, the drill bushing plate includes a pair of threaded holes formed in the face proximate the drill bushing sleeve, the locking member has a pair of apertures aligned with the threaded holes, and a pair of elongated pins, having heads larger than the apertures, protrude through the apertures in the locking plate and are threaded into the holes in the drill bushing plate. A pair of coiled springs are positioned between the heads of the screws and the locking member so that the springs bias the drill bushing plate toward the locking member. When the locking member is attached to the drill plate of the jig, the springs press the drill bushing sleeve into engagement with the production part and thereby ensure that the drill attached to the drill bushing plate is the same distance from the production part, regardless of differences in distance between the face of the drill plate and the production part.

It is understood that both the foregoing general description and the following detailed description are exemplary and explanatory only and are not restrictive of the invention, as claimed.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings.

Figure 1:
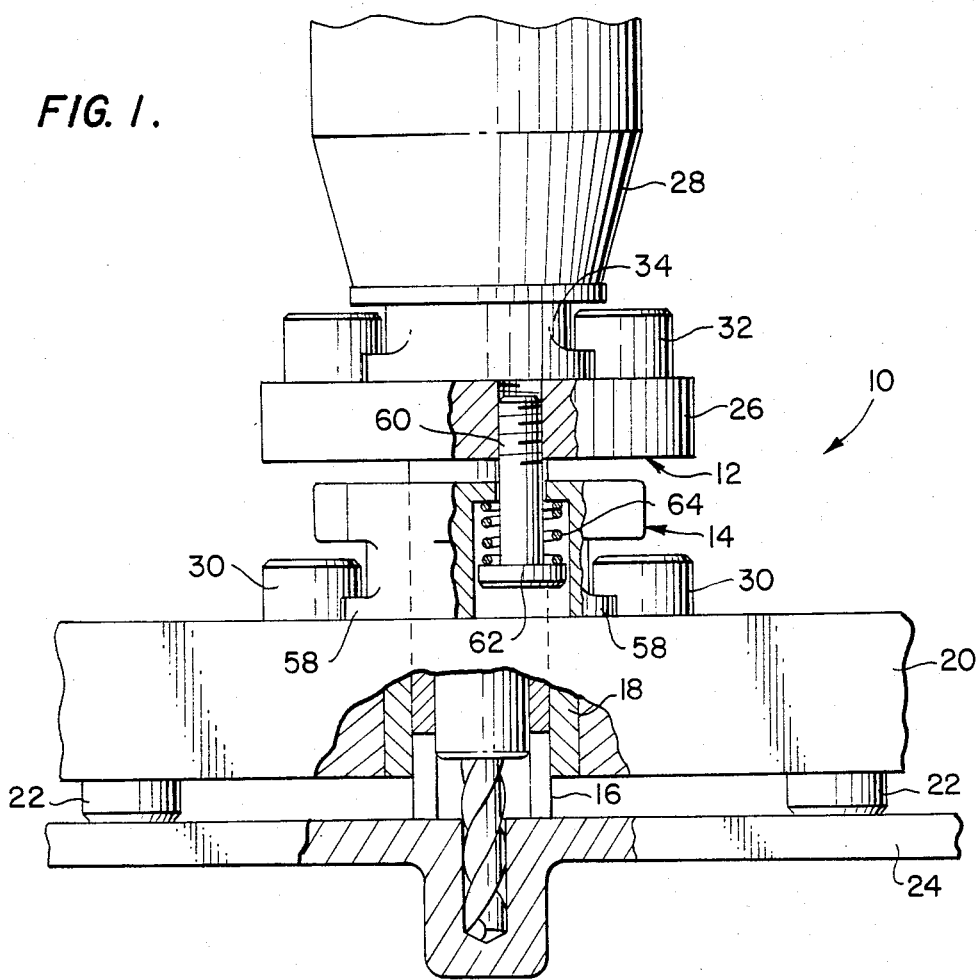
FIG. 1 is a partial cross section view of the depth control assembly attached at one end to a drill nose piece and at the other end to a drill plate of a jig placed on a production part.

As shown in FIG. 1, the depth control assembly, shown generally as 10, includes a bushing member shown generally as 12 and a locking member shown generally as 14. The bushing member 12 includes at its one end an elongated cylindrical bushing sleeve 16 for insertion into a bushing 18 formed in a guide hole in drill plate 20. Drill plate 20 is part of the jig with jig feet 22 that is positioned over production part 24. Bushing sleeve 16 engages production part 24 at its one end and at its opposite end is fixed to bushing plate 26. Bushing plate 26 in turn is fixed to a nose piece 28 of a machine tool, such as the portable drill.

As shown in FIG. 1, locking member 14 can be locked into engagement with drill plate 20 through the interaction of slotted lock screws 30 and the convex tapered ledges 58 on locking member 14. The rotation of the locking member in one direction will clamp the locking member tightly against the drill plate and the rotation in the opposite direction will release the locking member. Similarly, the nose piece of the drill can be fixed to the bushing plate 26 through the interaction of slotted locking screws 32 on the bushing plate 26 and the helical type locking device 34, which is conventionally part of a drill bushing attached to a drill.

Figure 2:
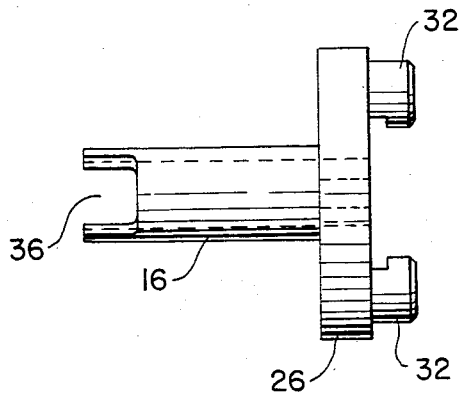
FIG. 2 is a side view of the bushing member of the depth control assembly.
Figure 3:
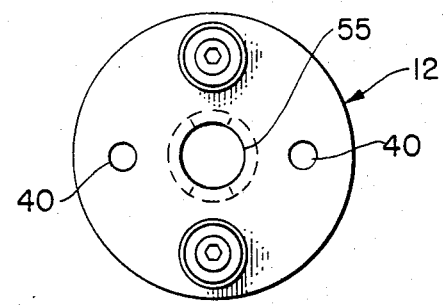
FIG. 3 is a plan view of the drill bushing member of the drill depth control assembly.

The bushing member 12 is shown in more detail in FIGS. 2 and 3. The bushing member includes a bushing sleeve 16 and bushing plate 26. The end of the bushing sleeve 16 includes two or more chip clearance slots 36 which provide room for the clearance of chips produced during the drilling process. Bushing plate 26 includes two slotted locking screws 32 which are fixed to the drill plate by any conventional means. As shown in FIG. 3, the bushing plate 26 includes two threaded screw holes 40 and the elongated aperture 55 for receiving a drill bushing and drill bit.

Figure 4:
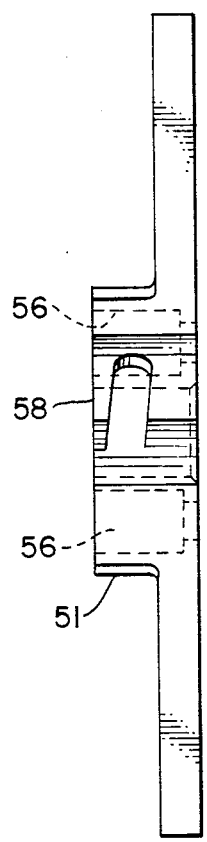
FIG. 4 is a side view of the locking member of the depth control assemly.
Figure 5:
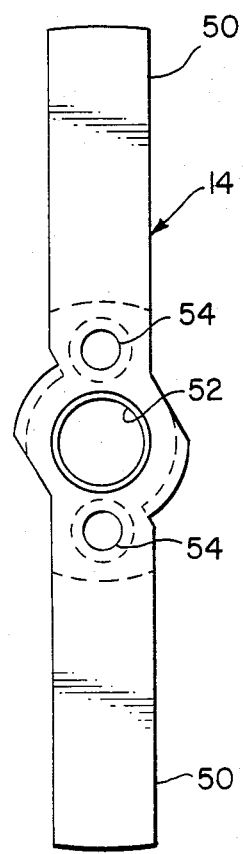
FIG. 5 is a plan view of the locking member of the depth control assembly.

The locking member 14 is shown in more detail in FIGS. 4 and 5. The locking member includes elongated handles 50, a cylindrical main body portion 51 and an elongated cylindrical aperture 52 for slidably receiving drill bushing sleeve 16. The locking member has two apertures 54, and immediately below each of those apertures is an elongated cylindrical recess 56. The bottom of the locking member is flat to fit securely against the drill plate 20 of a jig, and the locking member 14 includes two convex tapered ledges 58 designed to engage slotted locking screws 30 on a drill plate 20 of a jig.

Figure 6:
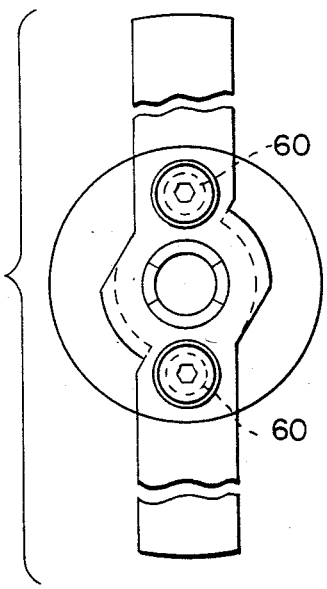
FIG. 6 is the bottom view of the bushing member and the locking member connected to form the depth control assembly.
Figure 7:
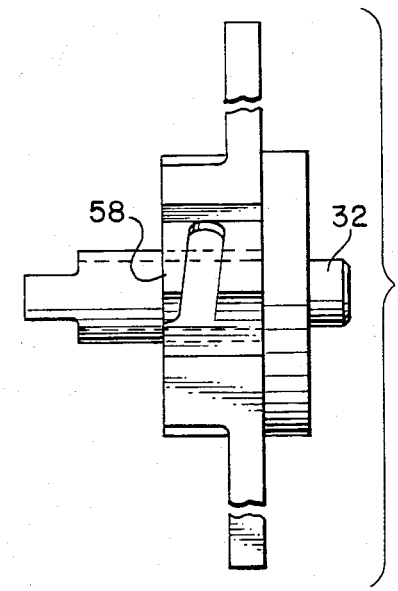
FIG. 7 is a side view showing the bushing member and the locking member connected to form the drill depth control assembly.

The combined bushing member and locking member are shown in FIGS. 1, 6 and 7. The locking member 14 fits over the bushing sleeve 16 and is slidably fixed to the bushing plate 26 by a pair of screws 60 which protrude through apertures 54 and thread into threaded holes 40 of bushing plate 26. A pair of coil springs 64 are positioned between the heads 62 of locking screws 60 and the wall of locking member 14 surrounding the apertures 54. The coil springs 64 therefore tend to bias the locking member 14 into engagement with the bushing plate 26. Thus, when locking member 14 is locked onto the drill plate 20, the coil springs 64 pull the bushing plate 26 downward and thereby press the bushing sleeve 16 into contact with the production part 24. This operation of the depth control assembly is best shown in FIG. 1.

The present invention therefore provides a spring-loaded adapter that locks onto a drill plate 20 at a drill bushing location equipped with locking screws 30. In operation, the drill bushing sleeve 16 is slipped into the drill plate liner bushing 18 until the end of the sleeve bushing 16 contacts the production part 24. The locking handle 50 is then pressed down depressing the spring 64 until the lower surface of the locking member 14 contacts the drill plate 20. The handle 50 is then rotated counterclockwise about one eighth turn to lock the locking member and therefore the drill depth control assembly onto the drill plate. The assembly is now secure on the drill plate.

The operator then takes a single measurement to the production part 24 in order to set the drilling depth on the portable drill. The drill motor assembly is then inserted and locked onto the bushing plate through the interaction of slotted locking screws 32 and helical locking member 34. Again, the bushing plate 26 and drill interlock through the counterclockwise rotation of the drill with respect to the bushing plate. The drill is then cycled to drill and retract and thus drill the desired hole in the production part. The depth control assembly, including the drill motor, can then be moved from hole to hole and will drill to the same depth as measured from the production part's outside mold line, regardless of the varying distance between the drill plate and the production part.

Although the above invention has been described for use with a drill, it is apparent that the depth control assembly can be used with a wide variety of machine tools which are used in machine production parts to selected depths. Thus, the invention is not limited to use with drills but encompasses all machining operations where a constant depth setting is desired.

Other embodiments of the invention will be apparent to those skilled in the art from consideration of the specification and practice of the invention disclosed herein. It is intended that the specification and examples be considered as exemplary only with a true scope and spirit of the invention being indicated by the following claims:

What is claimed is:

1. A depth control assembly for attachment at one end to a machine tool and at the other end to a drill plate of a jig having selected guide holes positioned over points to be machined in a production part, the depth control assembly comprising:

a bushing member including at its one end a bushing sleeve for insertion into a guide hole of the drill plate and for engagement with the production part and further including at its opposite end a bushing plate for engagement with the machine tool, a locking member slidably fitted over said bushing sleeve, said locking member including at least one aperture located opposite said bushing plate;

an elongated pin with a head larger than said aperture, said pin being slidably received by said aperture and being fixed to said bushing plate, means for temporarily fixing said locking member to the drill plate, and resilient means for pressing said bushing sleeve into engagement with the production part when the locking member is fixed to the drill plate, whereby a machine tool attached to the drill plate of the jig through the depth control assembly is spaced a constant distance from the production part, regardless of differences in distance between the face of the drill plate and the production part.

2. The depth control assembly of claim 1 wherein said resilient means include at least one coil spring positioned between the head of said pin and said locking member.

3. The depth control assembly of claim 2 wherein the drill plate has at least one slotted locking screw positioned proximate to a guide hold and wherein said means for fixing said locking member to the drill plate includes a convex tapered ledge formed on said locking member for engagement with the slotted locking screw, whereby the rotation of the locking member in one direction will clamp the locking member tightly against the drill plate and the rotation in the opposite direction will release the locking member.

4. The depth control assembly of claim 3 wherein said bushing sleeve includes chip clearance slots at the end opposite the bushing plate.

5. The depth control assembly of claim 4 wherein the machine tool has a taper lock proximate the nose of the tool and further comprising a pair of slotted locking pins fixed on the face of said bushing plate to receive the taper lock.

6. A drill depth control assembly for attachment at one end to a drill and at the other end to a drill plate of a jig having selected guide holes positioned over points to be drilled in a production part, the drill depth control assembly comprising:

a drill bushing member including at its one end a drill bushing sleeve for insertion into a guide hole of the drill plate and for engagement with the production part and further including at its opposite end a drill bushing plate for engagement with the drill, said drill bushing plate having a pair of threaded holes formed in the face proximate said drill bushing sleeve, a locking member slidably fitted over said drill bushing sleeve, said locking member having a pair of apertures aligned with said threaded holes, a pair of elongated pins with heads larger than said apertures, said pins protruding through said apertures and being threaded into said threaded holes, resilient means biasing said drill plate toward said locking member, and means for temporarily fixing said locking member to the drill plate, whereby a drill attached to the drill plate of the jig through the drill depth control assembly is spaced a constant distance from the production part, regardless of differences in distance between the face of the drill plate and the production part.

7. The depth control assembly of claim 6 wherein said resilient means includes a pair of coil springs, one each positioned between the head of one of said elongated screws and the locking member proximate said apertures.

8. The depth control assembly of claim 7 wherein the drill plate has at least one slotted locking screw positioned proximate to a guide hole and wherein said means for fixing said locking member to the drill plate includes a convex tapered ledge formed on said locking member for engagement with the slotted locking screws, whereby the rotation of the locking member in one direction will clamp the locking member tightly against the drill plate and the rotation in the opposite direction will release the locking member.

9. The depth control assembly of claim 8 wherein the drill has a taper lock proximate the nose of the drill and further comprising a pair of slotted locking pins fixed on the face of said drill bushing plate to receive the taper lock.

10. The depth control assembly of claim 9 wherein said drill bushing sleeve includes chip clearance slots at the end opposite the drill bushing plate.

* * * * *